United States Patent
Lan et al.

(10) Patent No.: US 7,961,118 B2
(45) Date of Patent: Jun. 14, 2011

(54) METHOD FOR DIFFERENTIATING HOTKEYS AND COMPUTER APPARATUS THEREOF

(75) Inventors: Wan-Chi Lan, Taipei Hsien (TW); Chien-Ming Chu, Taipei Hsien (TW)

(73) Assignee: Wistron Corporation, Xizhi Dist., New Taipei (TW)

( * ) Notice: Subject to any disclaimer, the term of this patent is extended or adjusted under 35 U.S.C. 154(b) by 957 days.

(21) Appl. No.: 11/847,348

(22) Filed: Aug. 30, 2007

(65) Prior Publication Data

US 2009/0032598 A1    Feb. 5, 2009

(30) Foreign Application Priority Data

Jul. 30, 2007   (TW) .............................. 96127726 A (51) Int. Cl.
*H03M 11/00*   (2006.01)

(52) U.S. Cl. ............ 341/26; 341/20; 345/172; 708/130; 710/67

(58) Field of Classification Search ............ 341/20, 341/26; 345/172; 708/130; 710/67
See application file for complete search history.

(56) References Cited

U.S. PATENT DOCUMENTS

| | | | |
|---|---|---|---|
| 6,181,262 B1 * | 1/2001 | Bennett | 341/26 |
| 7,170,498 B2 * | 1/2007 | Huang | 345/172 |

* cited by examiner

*Primary Examiner* — Albert K Wong
(74) *Attorney, Agent, or Firm* — Winston Hsu; Scott Margo (57) ABSTRACT

A method for differentiating hotkeys includes setting a plurality of hotkeys to correspond to a designated scan code and to correspond to a plurality of different identification codes, respectively, wherein the designated scan code and one identification code corresponding to each hotkey are outputted and the identification code is stored when each of the plurality of hotkeys is pressed; and determining whether a pressed key is one of the plurality of hotkeys according to whether any one of the plurality of identification codes is stored.

25 Claims, 5 Drawing Sheets

METHOD FOR DIFFERENTIATING HOTKEYS AND COMPUTER APPARATUS THEREOF

BACKGROUND OF THE INVENTION

1. Field of the Invention

The present invention relates to a method and related computer apparatus for differentiating hotkeys, and more particularly, to a method and related computer apparatus through setting a plurality of hotkeys to correspond to a designated scan code and to respectively correspond to a plurality of different identification codes and through determining whether the identification code is stored to differentiate whether a pressed key is a hotkey.

2. Description of the Prior Art

In Microsoft's graphical user interface windows, although the use of a mouse can handle lots of operations, the cooperation with keyboard hotkeys can make doing work more efficient, providing a user with a quick way to start and operate desired application programs.

To use Microsoft-defined scan codes as keyboard scan codes, it must first pass through Microsoft's certification before Microsoft's certification logo can be affixed. Furthermore, if other scan codes not defined by Microsoft are to be used as keyboard scan codes, and if any amendments have been made to the keyboard's programming, then the keyboard must be resubmitted for Microsoft's certification. This reiterative process is not only time-consuming and laborious, but also increases costs whenever the Microsoft's certification is resubmitted. For manufacturers, it is really a thorny issue.

SUMMARY OF THE INVENTION

It is one of the objectives of the claimed invention to provide a method for differentiating hotkeys and related computer apparatus to solve the abovementioned problems.

The present invention discloses a method for differentiating hotkeys. The method includes setting a plurality of hotkeys to correspond to a designated scan code and to respectively correspond to a plurality of different identification codes, wherein the designated scan code and one identification code corresponding to each hotkey are outputted and the identification code is stored when each of the plurality of hotkeys is pressed; and determining whether a pressed key is one of the plurality of hotkeys according to whether any one of the plurality of identification codes is stored. When a designated identification code of the plurality of identification code is stored, the pressed key is determined to be a designated hotkey corresponding to the designated identification code. When none of the plurality of identification codes are stored, the pressed key is determined not to be one of the plurality of hotkeys.

The present invention further discloses a method for differentiating hotkeys. The method includes setting at least one hotkey having a designated scan code and an identification code, wherein the identification code is pre-defined, and outputting the designated scan code and storing the identification code when the hotkey is pressed; and determining whether a pressed key is the hotkey according to whether the identification code is stored. When the identification code is stored, the pressed key is determined as the hotkey. When the identification code is not stored, the pressed key is determined not to be the hotkey.

The present invention further discloses a computer apparatus. The computer apparatus includes a first storage device, a keyboard, and a computer host. The keyboard has a plurality of keys, wherein the plurality of keys comprises a plurality of hotkeys corresponding to a designated scan code and respectively corresponding to a plurality of different identification codes. When each of the plurality of hotkeys is pressed, the designated scan code and an identification code corresponding to the hotkey are outputted and the identification code is written into the first storage device. The computer host is coupled to the keyboard and to the first storage device for determining whether a pressed key of the keyboard is one of the plurality of hotkeys according to whether one of the plurality of identification codes is stored in the first storage device.

In one embodiment, the computer host includes a keyboard scan code generating module, a second storage device, and a processing module. The keyboard scan code generating module is coupled to the keyboard for generating a scan code corresponding to the pressed the key when pressed. The second storage device is coupled to the first storage device for storing a BIOS (basic input/output system). The processing module is coupled to the keyboard scan code generating module and to the second storage device for inquiring the BIOS whether the key is one of the plurality of hotkeys when the scan code corresponding to the key is received from the keyboard scan code generating module. The BIOS detects whether one of the plurality of identification codes is stored, generates a judgment result, and relays the judgment result to notify the processing module whether the pressed key is one of the plurality of hotkeys.

In one embodiment, the processing module is implemented by executing an application program by a central processing unit.

In one embodiment, the first storage device is disposed inside the second storage device.

The present invention further discloses a computer apparatus. The computer apparatus includes a keyboard, a keyboard controller, a first storage device, and a processing module. The keyboard has a plurality of keys, wherein the plurality of keys comprises a plurality of hotkeys corresponding to a designated scan code and respectively corresponding to a plurality of different identification code. The keyboard controller is used for outputting the designated scan code and an identification code corresponding to the hotkey when one of the plurality of hotkeys is pressed. The first storage device is used for storing the identification code. The processing module is used for determining whether a pressed key of the keyboard is the hotkey according to whether the identification code is stored in the first storage device.

In one embodiment, the processing module executes an application program to communicate with a BIOS, and the BIOS detects the identification code stored in the first storage device.

The present invention further discloses a computer apparatus. The computer apparatus includes a keyboard controller, a first storage device, and a central processing unit. The keyboard controller is used for outputting a designated scan code and an identification code corresponding to a hotkey when the hotkey is pressed. The first storage device is used for storing the identification. The central processing unit is used for executing an application program to inquire whether the identification code is stored in the first storage device according to the designated scan code. If the identification code is stored in the first storage device, the central processing unit executes a function corresponding to the hotkey.

These and other objectives of the present invention will no doubt become obvious to those of ordinary skill in the art after reading the following detailed description of the preferred embodiment that is illustrated in the various figures and drawings.

DETAILED DESCRIPTION

Figure 1:
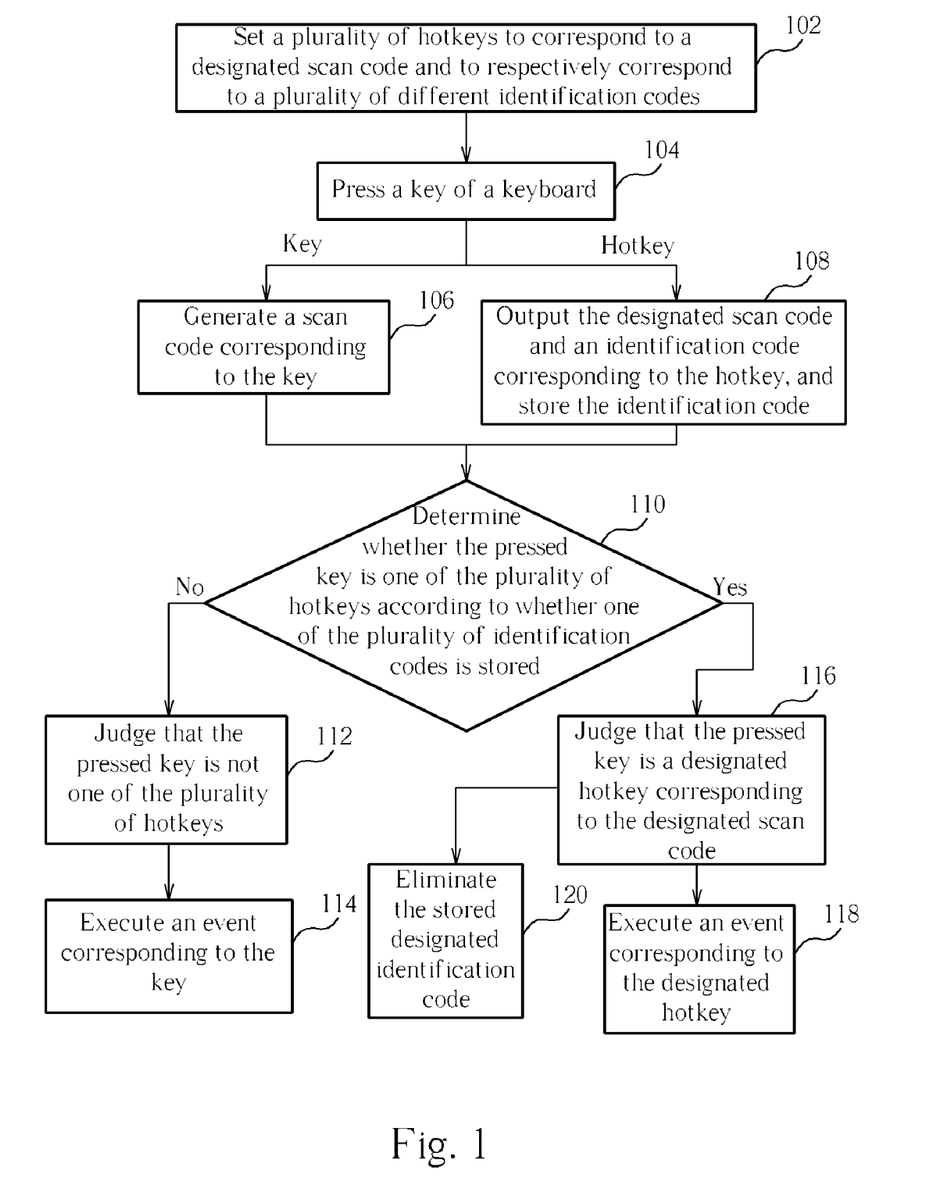
FIG. 1 is a flow chart illustrating a method for differentiating hotkeys according to an exemplary embodiment of the present invention.

Please refer to FIG. 1. FIG. 1 is a flow chart illustrating a method for differentiating hotkeys according to an exemplary embodiment of the present invention. Please note that the following steps are not limited to be performed according to the sequence shown in FIG. 1 if a roughly identical result can be obtained. The method includes the following steps:

Step 102: Set a plurality of hotkeys to correspond to a designated scan code and to respectively correspond to a plurality of different identification codes.

Step 104: Press a key of a keyboard. If the pressed key is a hotkey, go to Step 108; otherwise, go to Step 106.

Step 106: Generate a scan code corresponding to the key.

Step 108: Output the designated scan code and an identification code corresponding to the hotkey, and store the identification code.

Step 110: Determine whether the pressed key is one of the plurality of hotkeys according to whether one of the plurality of identification codes is stored. If a designated identification code of the plurality of identification codes is stored, go to Step 116; otherwise, go to Step 112.

Step 112: Judge that the pressed key is not one of the plurality of hotkeys.

Step 114: Execute an event corresponding to the key.

Step 116: Judge that the pressed key is a designated hotkey corresponding to the designated scan code.

Step 118: Execute an event corresponding to the designated hotkey.

Step 120: Eliminate the stored designated identification code.

Figure 2:
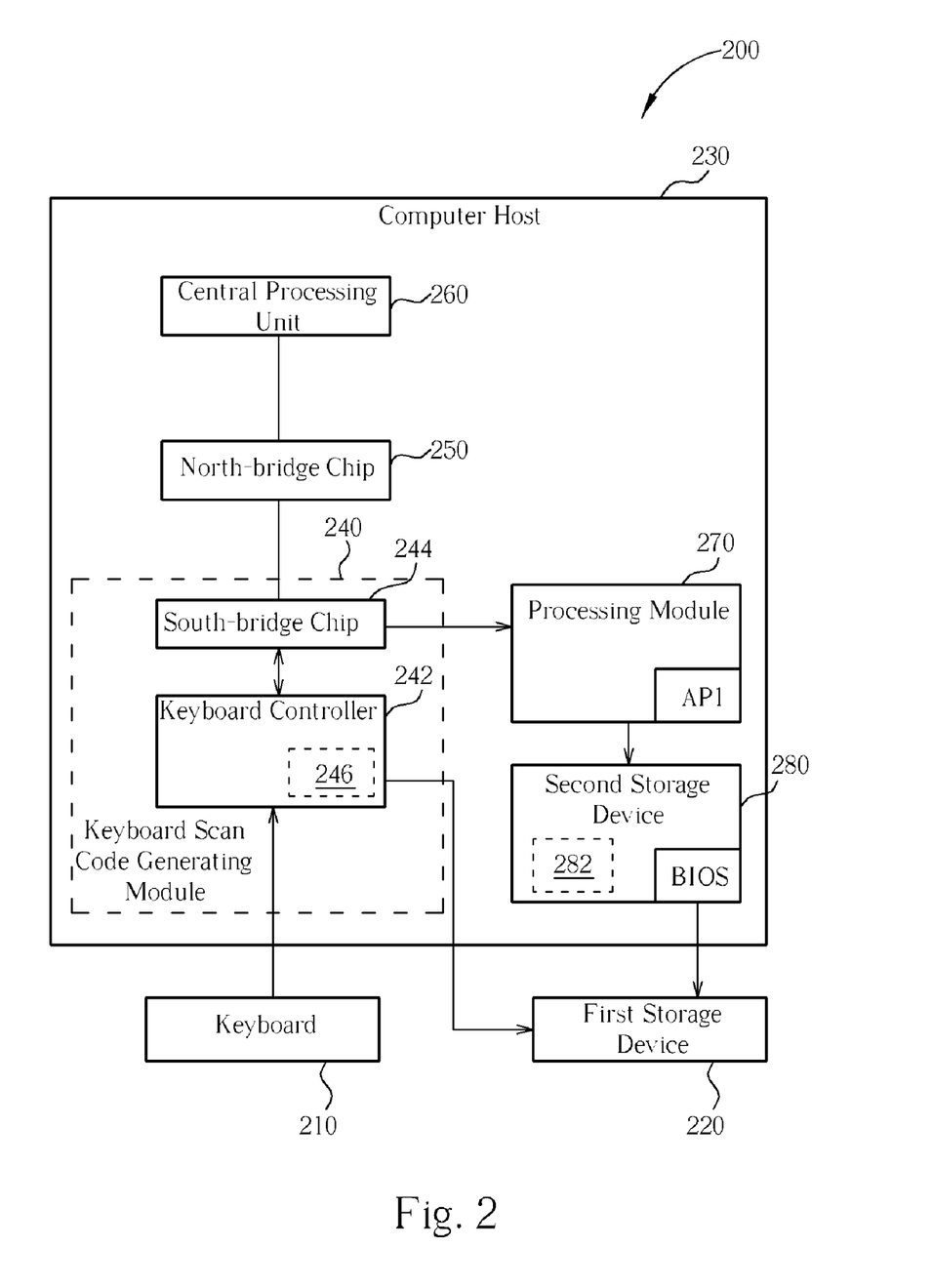
FIG. 2 is a diagram of a computer apparatus for differentiating hotkeys according to an embodiment of the present invention.

Please refer to FIG. 2. FIG. 2 is a diagram of a computer apparatus 200 for differentiating hotkeys according to an embodiment of the present invention. The computer apparatus 200 includes, but is not limited to, a keyboard 210, a first storage device 220, and a computer host 230. The keyboard 210 is coupled to the computer host 230 and has a plurality of keys, whereof the plurality of keys includes a plurality of hotkeys (please refer to FIG. 4 hereafter), and these hotkeys correspond to the same designated scan code (such as $SC_1$) and each hotkey respectively corresponds to different identification codes (such as $IDC_1$~$IDC_n$). The operations of the keyboard 210 and the first storage device 220 will be explained in detail in the following embodiments. In this embodiment, the first storage device 220 is an external storage device of the computer host 230. The computer host 230 is coupled to the keyboard 210 and to the first storage device 220 for determining whether a pressed key of the keyboard 210 is one of the plurality of hotkeys according to whether one of the plurality of identification codes (i.e. $IDC_1$~$IDC_n$) is stored into the first storage device 220. Please note that the "computer host" indicated in the present invention is an assembly of computer components coupled to the keyboard 210 and to the first storage device 220. Actually, it does not mean that the keyboard 210 and the first storage device 220 are limited to be apart from the computer host; that is, the keyboard 210 and/or the first storage device 220 can be integrated or built into the computer host 230, and this also belongs to the scope of the present invention.

Please continue referring to FIG. 2. The computer host 230 includes, but is not limited to, a keyboard scan code generating module 240, a north-bridge chip 250, a central processing unit 260, a processing module 270, and a second storage device 280. The keyboard scan code generating module 240 is coupled to the keyboard 210 and to the first storage device 220 for generating a scan code corresponding to a key when the key of the keyboard 210 is pressed. The keyboard scan code generating module 240 includes a keyboard controller (KBC) 242, a south-bridge chip 244. When a user presses a key, the keyboard controller 242 issues an interrupt request (IRQ) to the south-bridge chip 244. The south-bridge chip 244 inquires which key is pressed through the operating system (OS) and then generates a corresponding scan code SC to the processing module 270. The north-bridge chip 250 is used for coupling the south-bridge chip 244 and the central processing unit 260, but the operations of the north-bridge chip 250 are not the emphasis of the present invention and are therefore not detailed herein. The second storage device 280 is coupled to the first storage device 220 and to the processing module 270 for storing a basic input/output system (BIOS). The processing module 270 is coupled to the keyboard scan code generating module 240 and to the second storage device 280, where when the processing module 270 receives the scan code SC corresponding to the key generated from the keyboard scan code generating module 240, the processing module 270 will inquire of the BIOS whether the key is one of the plurality of hotkeys. The BIOS, then, detects whether one of the plurality of identification codes ($IDC_1$~$IDC_n$) is stored in the first storage device 220 to generate a judgment result and relay the judgment result to the processing module 270 to notify whether the pressed key is one of the plurality of hotkeys. The operations of the keyboard scan code generating module 240, the processing module 270, the second storage device 280, and the first storage device 220 are further detailed in the following embodiments.

Please note that the abovementioned processing module 270 can be implemented by executing an application program AP1 (which can be stored in any storage media of the computer host 230 to be accessed by the central processing unit 260) through the central processing unit 260, but is not limited to this, and can be implemented through other ways. For example, the processing module 270 can be implemented through hardware, software, or their combination. In one embodiment, the second storage device 280 is an erasable programmable read only memory (EPROM) or a flash memory, but this is merely one example for illustrating features of the present invention and should not taken to be a limitation of the present invention.

Figure 3:
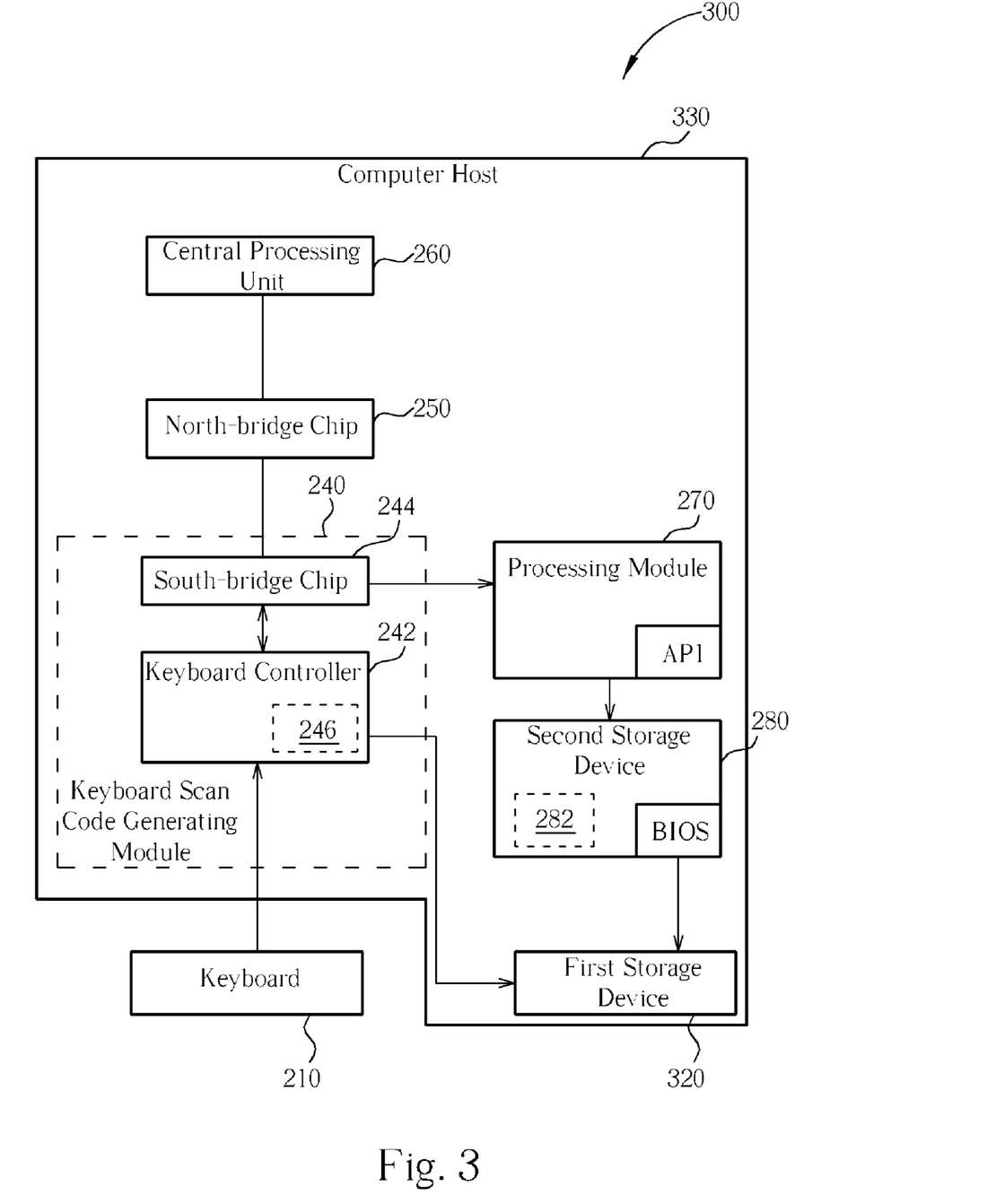
FIG. 3 is a diagram of a computer apparatus for differentiating hotkeys according to another embodiment of the present invention.

Please also note that the first storage device 220 can be a memory or a hard disc, but is not limited to this only and can be other types of storage devices. Furthermore, the first storage device 220 can be disposed outside the second storage device 280, such as in the position shown in FIG. 2. The first storage device 220 can be disposed inside the second storage device 280, such as in position 282 shown in FIG. 2 The first storage device 220 can be disposed in a built-in memory 246 of the keyboard controller 242, or the first storage device 220 can be an external storage device such as a USB flash disk, but these are only examples for illustrating features of the present invention and are not limitations of the present invention. Please refer to FIG. 3. FIG. 3 is a diagram of a computer apparatus 300 for differentiating hotkeys according to another embodiment of the present invention. The computer apparatus 300 shown in FIG. 3 is similar to the computer apparatus shown in FIG. 2; the difference between them is that a first storage device 320 of the computer apparatus 300 is disposed inside a computer host 330 and is coupled to the keyboard controller 242.

The application program AP1 of the processing module 270 communicates with the BIOS, for example, can be implemented through the WMI (Windows Management Instrumentation) method to inquire the BIOS, but should not be construed as a limitation of the present invention. Those skilled in the art should understand its operations and it is therefore not detailed herein for brevity.

Please note that, the abovementioned computer apparatuses 200 and 300 are not limited to desktop personal computers (PC), and can be a notebook PC. Hence, the computer host 230 includes other computer components except the keyboard 210. Those skilled in the art should know that this is not a limitation of the present invention.

Figure 5:
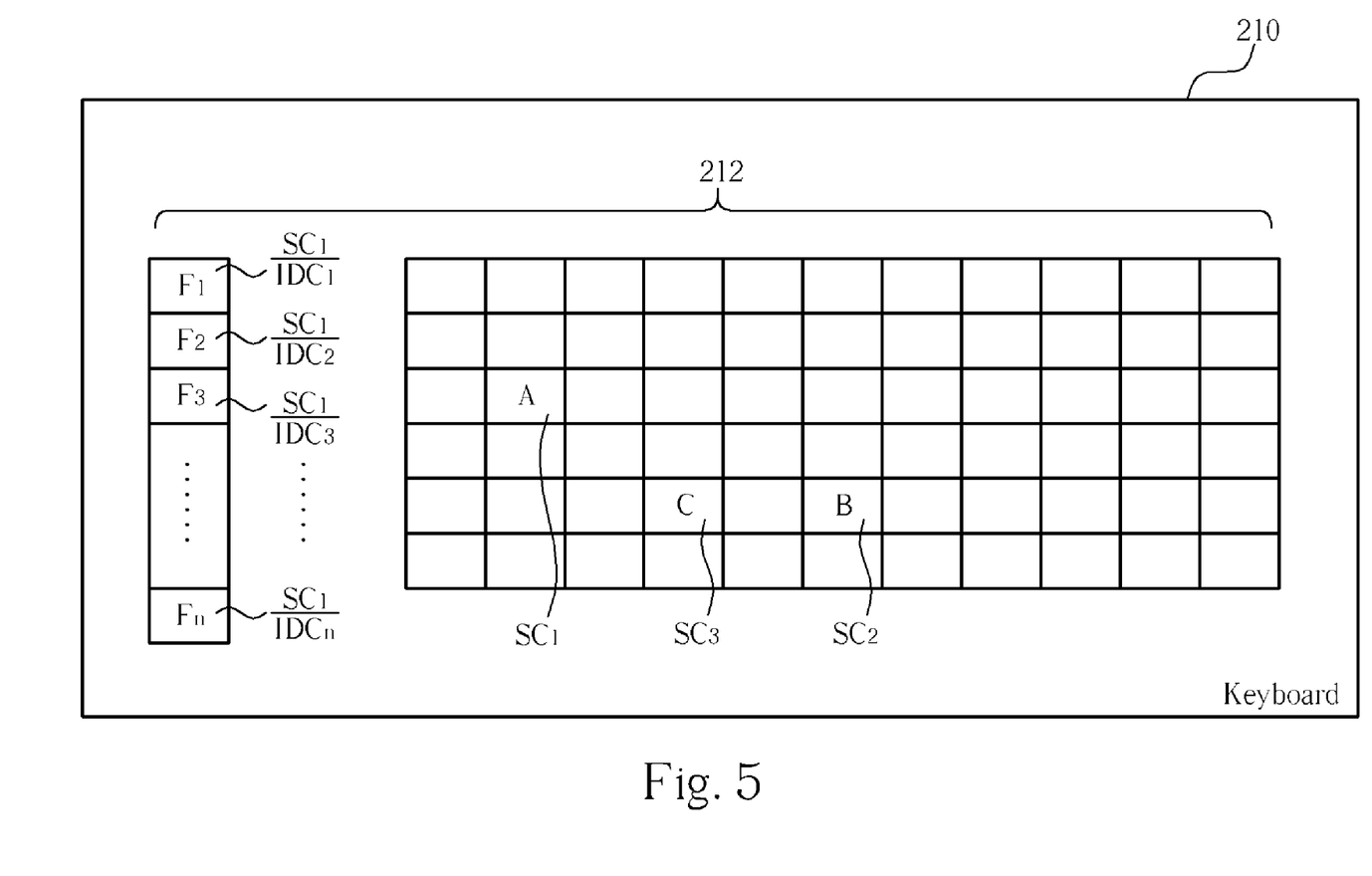
FIG. 5 is a brief diagram of an example of the keyboard in FIG. 2.

Please refer to FIG. 5. FIG. 5 is a brief diagram of an example of the keyboard 210 in FIG. 2. The keyboard 210 has a plurality of keys 212, whereof the plurality of keys 212 includes a plurality of hotkeys $F_1 \sim F_n$. Each one of the hotkeys $F_1 \sim F_n$ corresponds to a designated scan code $SC_1$, and respectively corresponds to different identification codes $IDC_1 \sim IDC_n$. The keys A, B, and C are not the set hotkeys, wherein the key A corresponds to the designated scan code $SC_1$, and the keys B and C correspond to scan codes $SC_2$ and $SC_3$, respectively. In the following description, how each element operates is described by collocating the steps shown in FIG. 1 and the elements shown in FIG. 2.

In Step 102, the plurality of hotkeys $F_1 \sim F_n$ of the keyboard 210 are set to correspond to the designated scan code $SC_1$ and each of the hotkeys $F_1 \sim F_n$ are set to correspond to different identification codes $IDC_1 \sim IDC_n$. In the step 104, a key of the keyboard 210 is pressed. In the following, descriptions are divided into two conditions. In a first condition, the pressed key (such as the key A) is not a hotkey and Step 106 is therefore performed. The keyboard scan code generating module 240 generates the scan code $SC_1$ corresponding to the key A. When the processing module 270 receives the scan code $SC_1$ corresponding to the key A generated from the keyboard scan code generating module 240, the processing module 270 will check whether one of the plurality of identification codes $IDC_1 \sim IDC_n$ is stored in the first storage device 220 (step 110). Because there is no identification code ($IDC_1 \sim IDC_n$) stored in the first storage device 220, Step 112 determines that the pressed key A is not one of the plurality of hotkeys $F_1 \sim F_n$ and then Step 114 is performed for executing the event corresponding to the key A. In the second condition, assume that the pressed key is the hotkey $F_1$, and therefore Step 108 is performed. The keyboard scan code generating module 240 will output the designated scan code $SC_1$ corresponding to the hotkey $F_1$ and the keyboard controller 242 will output the identification code $IDC_1$ corresponding to the hotkey $F_1$ and store it in the first storage device 220. When the processing module 270 receives the designated scan code $SC_1$ corresponding to the hotkey $F_1$ generated from the keyboard scan code generating module 240, the processing module 270 will check whether one of the plurality of identification codes $IDC_1 \sim IDC_n$ is stored in the first storage device 220 (Step 110). Because the identification code $IDC_1$ is stored in the first storage device 220, Step 116 determines that the pressed hotkey $F_1$ is the hotkey corresponding to the designated scan code $SC_1$ and then Step 118 executes the event corresponding to the hotkey $F_1$. Furthermore, after the computer host 230 determines that the pressed key is the hotkey $F_1$, the computer host 230 eliminates the identification code $IDC_1$ stored in the first storage device 220 (Step 120).

Of course, the abovementioned application program AP1 of the processing module 270 is merely an exemplary embodiment of the present invention. In other embodiments, more functions are designated into the application program AP1 to provide the computer apparatus 200 with more choices. For example, a comparison function can be added into the application program AP1. Before receiving a scan code corresponding to a key, the scan code corresponding to the pressed key is compared with the designated scan code $SC_1$. Only when the scan code corresponding to the pressed code is the designated scan code $SC_1$, the application program AP1 of the processing module 270 will perform the abovementioned judging step. Therefore, the processing efficiency for differentiating hotkeys can be improved and unnecessary data searches in the first storage device 220 can be reduced, which can further lower power consumption.

Figure 4:
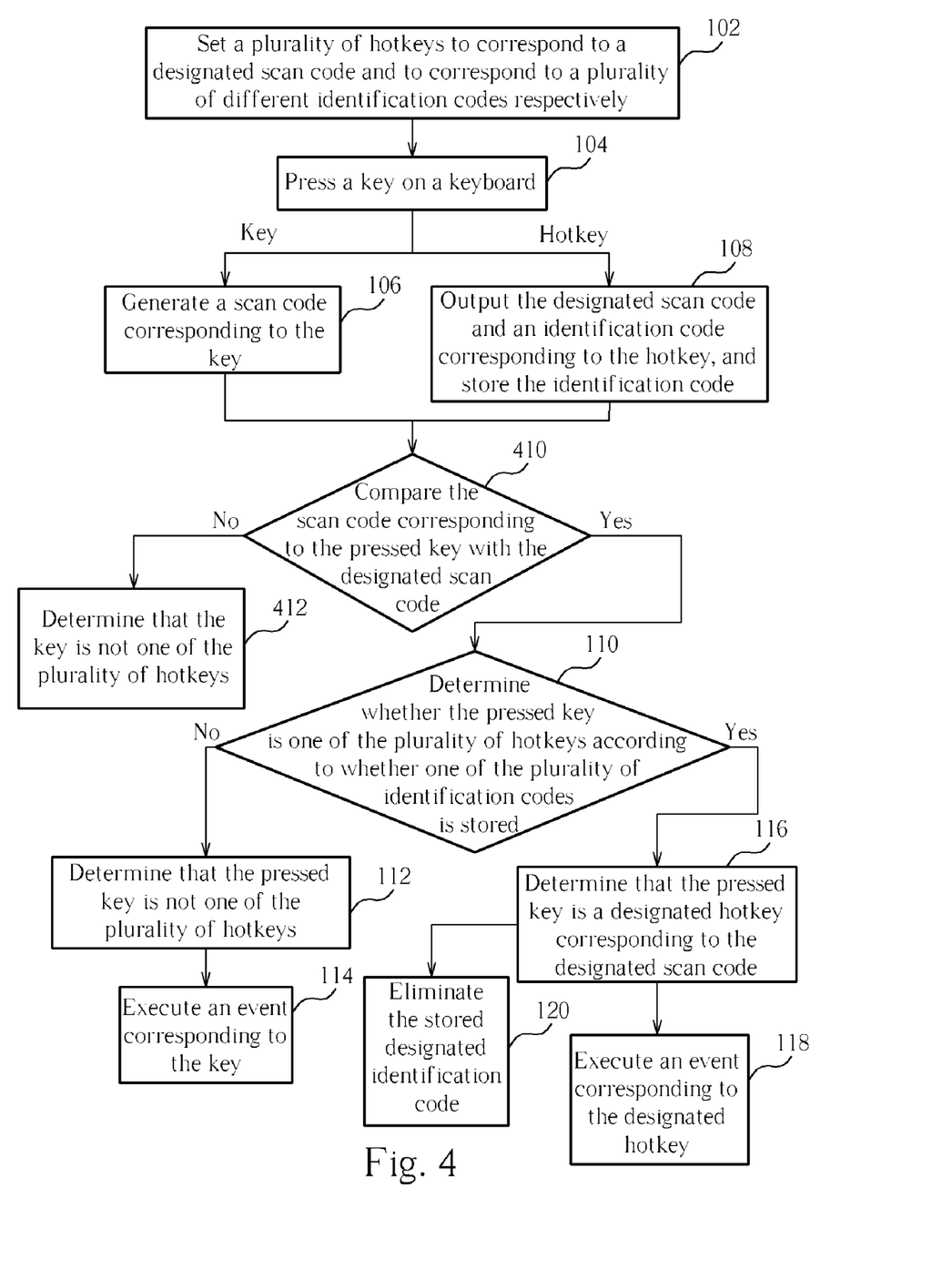
FIG. 4 is a flow chart illustrating a method for differentiating hotkeys according to another exemplary embodiment of the present invention.

Please refer to FIG. 4. FIG. 4 is a flow chart illustrating a method for differentiating hotkeys according to another exemplary embodiment of the present invention. The method includes the following steps:

Step 102: Set a plurality of hotkeys to correspond to a designated scan code and to correspond to a plurality of different identification codes respectively.

Step 104: Press a key on a keyboard. If the pressed key is a hotkey, go to Step 108; otherwise, go to Step 106.

Step 106: Generate a scan code corresponding to the key.

Step 108: Output the designated scan code and an identification code corresponding to the hotkey, and store the identification code.

Step 410: Compare the scan code corresponding to the pressed key with the designated scan code. If the scan code corresponding to the pressed key is the designated scan code, go to Step 110; otherwise, go to Step 412.

Step 412: Determine that the key is not one of the plurality of hotkeys.

Step 110: Determine whether the pressed key is one of the plurality of hotkeys according to whether one of the plurality of identification codes is stored. If a designated identification code of the plurality of identification codes is stored, go to Step 116; otherwise, go to Step 112.

Step 112: Determine that the pressed key is not one of the plurality of hotkeys.

Step 114: Execute an event corresponding to the key.

Step 116: Determine that the pressed key is a designated hotkey corresponding to the designated scan code.

Step 118: Execute an event corresponding to the designated hotkey.

Step 120: Eliminate the stored designated identification code.

The steps shown in FIG. 4 are similar to that in FIG. 1, and FIG. 4 is a varied embodiment of FIG. 1. The difference between them is that FIG. 4 further adds a comparison function into the application program AP1 (i.e. the steps 410-412). In the following, how each element operates is described by collocating the steps shown in FIG. 4 and the elements shown in FIG. 2.

In Step 102, the plurality of hotkeys $F_1 \sim F_n$ of the keyboard 210 are set to correspond to the designated scan code $SC_1$ and each one of the hotkeys $F_1 \sim F_n$ are set to correspond to different identification codes $IDC_1 \sim IDC_n$. In the step 104, a key of the keyboard 210 is pressed. In the following, descriptions are divided into several conditions. In a first condition, assume the pressed key is the key B, which is not a hotkey and corresponds to the scan code $SC_2$; hence, Step 106 is performed. The keyboard scan code generating module 240 generates the scan code $SC_2$ corresponding to the key B, and the processing module 270 will compare the scan code $SC_2$ corresponding to the key B with the designated scan code $SC_1$ when receiving the scan code $SC_2$ corresponding to the key B generated from the keyboard scan code generating module 240 (Step 410). Because scan code $SC_2$ corresponds to key B and does not conform to the designated scan code $SC_1$, Step 412 judges that key B is not one of the plurality of hotkeys $F_1 \sim F_n$. In the second condition, the pressed key is the key A, which is not a hotkey and corresponds to the designated scan code $SC_1$, so Step 106 is performed. The keyboard scan code generating module 240 generates the scan code $SC_1$ corresponding to the key A. When the processing module 270 receives the scan code $SC_1$ corresponding to the key A generated from the keyboard scan code generating module 240, the processing module 270 will compare the scan code $SC_1$ corresponding to the key A with the designated scan code $SC_1$ (step 410). The scan code $SC_1$ corresponding to key A conforms to the designated scan code $SC_1$, so Step 110 checks whether one of the plurality of identification codes $IDC_1 \sim IDC_n$ is stored in the first storage device 220. Due to there being no identification code $IDC_1 \sim IDC_n$ stored in the first storage device 220, Step 112 determines that the pressed key A is not one of the plurality of hotkeys $F_1 \sim F_n$ and then Step 114 executes the event corresponding to the key A. In the third condition, the pressed key is the hotkey $F_1$, and Step 108 is performed. The keyboard scan code generating module 240 will output the designated scan code $SC_1$ corresponding to the hotkey $F_1$ and the keyboard controller 242 will output the identification code $IDC_1$ corresponding to the hotkey $F_1$ and store it in the first storage device 220. When the processing module 270 receives the designated scan code $SC_1$ corresponding to the hotkey $F_1$ generated from the keyboard scan code generating module 240, the processing module 270 compares the designated scan code $SC_1$ corresponding to the hotkey $F_1$ with the designated scan code $SC_1$ (Step 410). Due to the designated scan code $SC_1$ corresponding to the hotkey $F_1$ matching the designated scan code $SC_1$, Step 110 is performed for checking whether one of the plurality of identification codes $IDC_1 \sim IDC_n$ is stored in the first storage device 220. Because the identification code $IDC_1$ is stored in the first storage device 220, Step 116 determines that the pressed hotkey $F_1$ is the hotkey corresponding to the designated scan code $SC_1$ and then Step 118 executes the event corresponding to the hotkey $F_1$. Furthermore, after the computer host 230 determines that the pressed key is the hotkey $F_1$, the computer host 230 eliminates the identification code $IDC_1$ stored in the first storage device 220 (Step 120).

These embodiments above are presented merely for describing applications of the present invention, and in no way should be considered to be limitations of the scope of the present invention. It will be obvious to those skilled in the art that various modifications of the application program AP1 in the processing module 270 may be made without departing from the spirit of the present invention.

The abovementioned embodiments are presented merely for describing the present invention, and in no way should be considered to be limitations of the scope of the present invention. The abovementioned computer apparatuses 200 and 300 can be a desktop PC or a notebook PC, but are not limited to this only and can be computer apparatuses of other types. The processing module 270 can be implemented by executing the application program AP1 through the central processing unit 260, but is not limited to this and can be implemented through other ways. In addition, the processing module 270 above are presented merely for describing applications of the present invention. Those skilled in the art should appreciate that various modifications of the application program AP1 in the processing module 270 may be made without departing from the spirit of the present invention. In one embodiment, the second storage device 280 is an erasable programmable read only memory (EPROM) or a flash memory, but this is merely an example for illustrating features of the present invention and should not be limitations of the present invention. The first storage device 220 can be a memory or a hard disc, but is not limited to them only and can be storage devices in other types. Furthermore, the first storage device 220 can be a built-in storage device or an external storage device, such as a USB flash disk, but should not be limitations of the present invention. The number n of the abovementioned hotkeys $F_1 \sim F_n$ is not a fixed value and can be adjusted according to user demands.

In summary, the present invention provides a method and related computer apparatus for differentiating hotkeys. Through setting the plurality of hotkeys $F_1 \sim F_n$ to correspond to the same designated scan code $SC_1$ and correspond to different identification codes $IDC_1 \sim IDC_n$, respectively, the present invention determines whether the pressed key is one of the plurality of hotkeys $F_1 \sim F_n$ according to whether one of the identification codes $IDC_1 \sim IDC_n$ is stored. Please note that, the identification codes $IDC_1 \sim IDC_n$ in the abovementioned embodiments are especially defined and directly set to the hotkeys $F_1 \sim F_n$; that is, when a hotkey is pressed, the desired identification codes in the follow-up procedures for differentiating hotkeys won't be generated through other mechanisms. As a result, the identification codes disclosed in the present invention are different from the ASCII codes transformed through a keyboard scan code and a mapping table in the conventional art. That is, the identification codes of each hotkey are especially set and are not transformed from its scan code. Therefore, when a hotkey is pressed, its corresponding scan code and identification code will be outputted at the same time, and its identification code will be written into the first storage devices 220 and 320 shown in FIG. 2 and FIG. 3. However, the present invention is not limited to output the corresponding scan code and the identification code of the hotkey at the same time. In other embodiments, before the processing module 270 shown in FIG. 2 and FIG. 3 receives the scan code corresponding to the hotkey and starts the hotkey differentiation procedure, the identification code corresponding to the hotkey should be outputted and stored in the first storage devices 220 and 320, which can also achieve a goal of differentiating hotkeys. In addition, a comparison function can be added into the application program AP1 of the processing module 270 to improve the efficiency for differentiating hotkeys further. Therefore, not only can users set different hotkey functions according to their demands, but manufacturers also can save time and cost on passing through certifications, which is a great boon in consideration of convenience and economy.

Those skilled in the art will readily observe that numerous modifications and alterations of the device and method may be made while retaining the teachings of the invention.

What is claimed is:

1. A method for differentiating hotkeys comprising:
setting a plurality of hotkeys to correspond to a designated scan code and to respectively correspond to a plurality of different identification codes, wherein the designated scan code and one identification code corresponding to each hotkey are outputted and the identification code is stored when each of the plurality of hotkeys is pressed; and
determining whether a pressed key is one of the plurality of hotkeys according to whether one of the plurality of identification codes is stored.

2. The method of claim 1 further comprising:
generating a scan code corresponding to a key when the key is pressed;
wherein the step of determining whether the pressed key is one of the plurality of hotkeys comprises:
when receiving the scan code corresponding to the key, inquiring a BIOS (basic input/output system) whether the key is one of the plurality of hotkeys; and
utilizing the BIOS to detect whether one of the plurality of identification codes is stored to generate a judgment result and relaying the judgment result to notify whether the pressed key is one of the plurality of hotkeys.

3. The method of claim 2, wherein the step of the BIOS responding the judgment result comprises:
when a designated identification code of the plurality of identification codes is stored, determining the pressed key is a designated hotkey corresponding to the designated identification code; and
when none of the plurality of identification codes is stored, determining the pressed key is not one of the plurality of hotkeys.

4. The method of claim 1, wherein the step of determining whether the pressed key is one of the plurality of hotkeys comprises:
when a designated identification code of the plurality of identification code is stored, determining the pressed key to be a designated hotkey corresponding to the designated identification code; and
when none of the plurality of identification codes are stored, determining the pressed key to not be one of the plurality of hotkeys.

5. The method of claim 4, wherein the step of determining the pressed key is the designated hotkey corresponding to the designated identification code further comprises:
eliminating the stored designated identification code after determining the designated hotkey.

6. The method of claim 1 further comprising:
generating a scan code corresponding to a key when the key is pressed;
comparing the scan code corresponding to the pressed key with the designated scan code; and
when the scan code corresponding to the pressed key is not the designated scan code, determining the key is not one of the plurality of hotkeys;
wherein the step of determining whether the pressed key is one of the plurality of hotkeys is executed only when the scan code corresponding to the pressed key is the designated scan code.

7. A method for differentiating hotkeys comprising:
setting at least one hotkey having a designated scan code and an identification code, wherein the identification code is pre-defined, and outputting the designated scan code and storing the identification code when the hotkey is pressed; and
determining whether a pressed key is the hotkey according to whether the identification code is stored.

8. The method of claim 7 further comprising:
generating a scan code corresponding to a key when the key is pressed;
wherein the step of determining whether the pressed key is the hotkey comprises:
when receiving the scan code corresponding to the key, inquiring a BIOS (basic input/output system) whether the key is the hotkey; and
the BIOS detecting whether the identification codes is stored to generate a judgment result and relaying the judgment result to notify whether the pressed key is the hotkey.

9. The method of claim 8, wherein the step of the BIOS responding the judgment result comprises:
when the identification code is stored, determining the pressed key is the hotkey; and
when the identification code is not stored, determining the pressed key is not the hotkey.

10. The method of claim 7, wherein the step of determining whether the pressed key is the hotkey comprises:
when the identification code is stored, determining the pressed key is the hotkey; and
when the identification code is not stored, determining the pressed key is not the hotkey.

11. The method of claim 10, wherein the step of determining the pressed key is the hotkey further comprises:
eliminating the stored identification code after determining the hotkey.

12. The method of claim 7 further comprising:
generating a scan code corresponding to the key when the key is pressed;
comparing the scan code corresponding to the pressed key with the designated scan code; and
when the scan code corresponding to the pressed key is not the designated scan code, determining the key is not the hotkey;
wherein the step of determining whether the pressed key is the hotkey is executed only when the scan code corresponding to the pressed key is the designated scan code.

13. A computer apparatus comprising:
a first storage device;
a keyboard having a plurality of keys, wherein the plurality of keys comprises a plurality of hotkeys corresponding to a designated scan code and respectively corresponding to a plurality of different identification codes, and when each one of the plurality of hotkeys is pressed, the designated scan code and an identification code corresponding to the hotkey are outputted and the identification code is written into the first storage device; and
a computer host, coupled to the keyboard and to the first storage device, for determining whether a pressed key of the keyboard is one of the plurality of hotkeys according to whether one of the plurality of identification codes is stored in the first storage device.

14. The computer apparatus of the claim 13, wherein the computer host comprises:
a keyboard scan code generating module, coupled to the keyboard, for generating a scan code corresponding to the pressed when the key is pressed;
a second storage device, coupled to the first storage device, for storing a BIOS (basic input/output system); and
a processing module, coupled to the keyboard scan code generating module and to the second storage device, for inquiring the BIOS whether the key is one of the plurality of hotkeys when receiving the scan code corresponding to the key from the keyboard scan code generating module, wherein the BIOS detects whether one of the plurality of identification codes is stored to generate a judgment result and relays the judgment result to notify the processing module whether the pressed key is one of the plurality of hotkeys.

15. The computer apparatus of claim 14, wherein when the BIOS detects that a designated identification code of the plurality of identification codes is stored in the first storage device, the BIOS judges that the pressed key is a designated hotkey corresponding to the designated identification code to generate the judgment result; and when the BIOS does not detect that any one of the plurality of identification codes is stored in the first storage device, the BIOS judges that the pressed key is not one of the plurality of hotkeys to generate the judgment result.

16. The computer apparatus of claim 14, wherein the processing module is implemented by executing an application program through a central processing unit.

17. The computer apparatus of claim 14, wherein the first storage device is disposed inside the second storage device.

18. The computer apparatus of claim 13, wherein when the computer host detects that a designated identification code of the plurality of identification codes is stored in the first storage device, the computer host judges that the pressed key is a designated hotkey corresponding to the designated identification code; and when the computer host does not detect that any one of the plurality of identification codes is stored in the first storage device, the computer host judges that the pressed key is not one of the plurality of hotkeys.

19. The computer apparatus of claim 18, wherein after the computer host judges that the pressed key is the designated hotkey corresponding to the designated identification code, the computer host eliminates the stored designated identification code.

20. The computer apparatus of claim 13, wherein the computer host comprises:
a keyboard scan code generating module, coupled to the keyboard, for generating a scan code corresponding to the pressed key when the key is pressed; and
a processing module, coupled to the keyboard scan code generating module, for comparing the scan code corresponding to the pressed key with the designated scan code, wherein when the scan code corresponding to the pressed key is not the designated scan code, the processing module judges that the key is not one of the plurality of hotkeys, and only when the scan code corresponding to the pressed key is the designated scan code, the processing module determines whether the pressed key of the keyboard is one of the plurality of hotkeys according to whether one of the plurality of identification codes is stored in the first storage device.

21. The computer apparatus of claim 20, wherein the processing module is implemented by executing an application program through a central processing unit.

22. A computer apparatus comprising:
a keyboard having a plurality of keys, wherein the plurality of keys comprises a plurality of hotkeys corresponding to a designated scan code and respectively corresponding to a plurality of different identification code;
a keyboard controller, for outputting the designated scan code and an identification code corresponding to the hotkey when one of the plurality of hotkeys is pressed;
a first storage device, for storing the identification code; and
a processing module, for determining whether a pressed key of the keyboard is the hotkey according to whether the identification code is stored in the first storage device.

23. The computer apparatus of claim 22, wherein the processing module executes an application program to communicate with a BIOS, and the BIOS detects the identification code stored in the first storage device.

24. A computer apparatus comprising:
a keyboard controller, for outputting a designated scan code and an identification code corresponding to a hotkey when the hotkey is pressed;
a first storage device, for storing the identification code; and
a central processing unit, for executing an application program to inquire whether the identification code is stored in the first storage device according to the designated scan code, wherein if the identification code is stored in the first storage device, the central processing unit executes a function corresponding to the hotkey.

25. The computer apparatus of claim 24, wherein the central processing unit executes an application program to communicate with a BIOS, and the BIOS inquires data stored in the first storage device.

* * * * *